3,498,861
METHOD OF MAKING A WOUND FOIL TYPE SOLID ELECTROLYTIC CONDENSER
Takeshi Namikata, Kawasaki, and Kentaro Hirata, Tokyo, Japan, assignors to Fujitsu Limited, Kawasaki, Japan, a corporation of Japan
Filed Apr. 13, 1965, Ser. No. 447,919
Claims priority, application Japan, Apr. 15, 1964, 39/211,157
Int. Cl. B65h *81/00;* B32b *31/04;* B44d *1/18*
U.S. Cl. 156—192    5 Claims

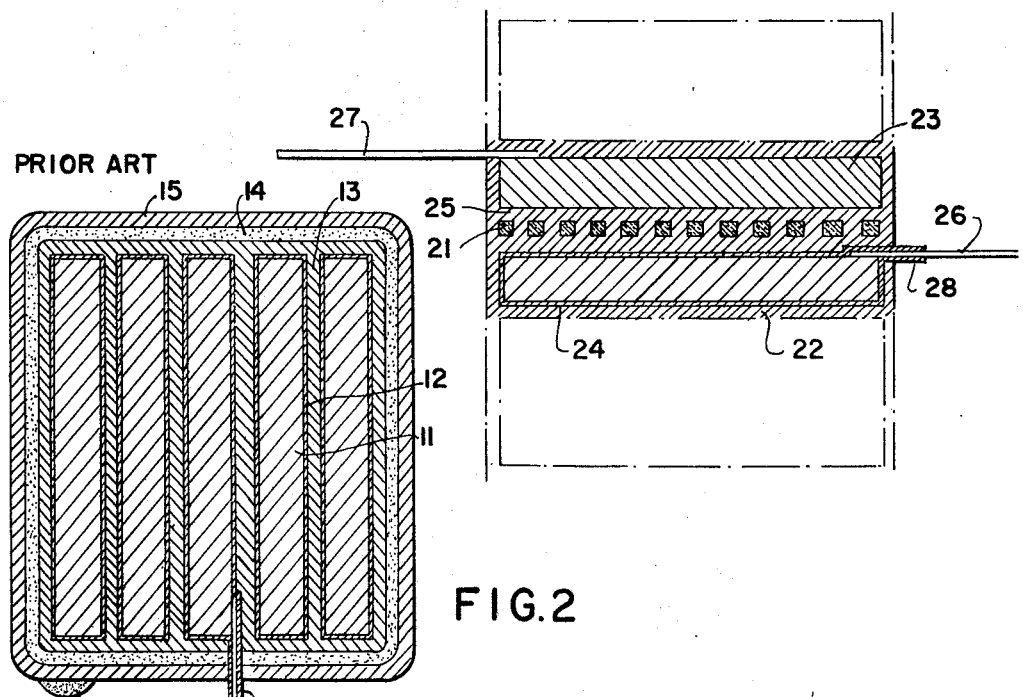
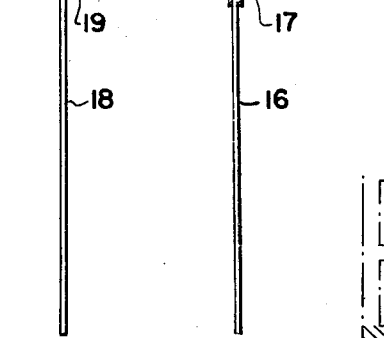
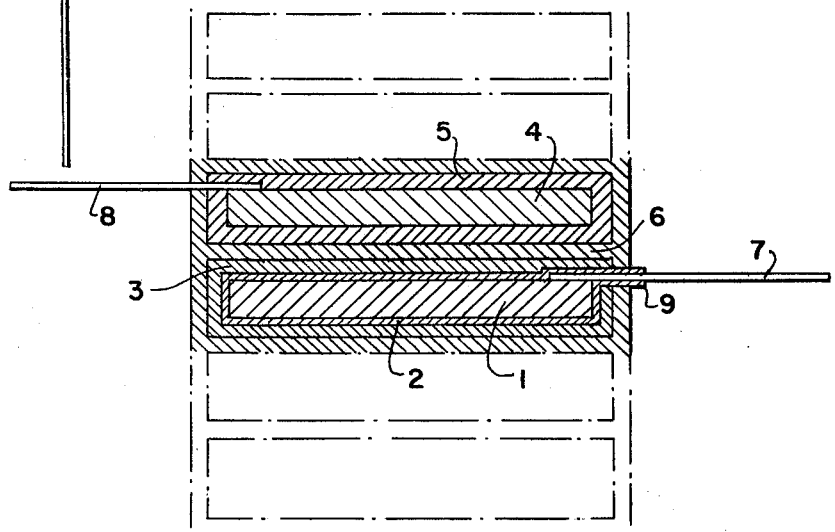

ABSTRACT OF THE DISCLOSURE

In a method of manufacture of a wound foil type solid electrolytic condenser, a semiconductor layer is applied to a cathode foil. An anode foil and the semiconductor-covered cathode foil are placed in juxtaposition. Both the anode foil and the semiconductor-covered cathode foil are wound together as a unit.

Description of the invention

The present invention relates to a method of manufacture of an electrolytic condenser. More particularly, the invention relates to a method of manufacture of a wound foil type solid electrolytic condenser.

A solid electrolytic condenser utilizing metal of anode oxidized film forming property such as tantalum, aluminum and titanium as the anode element, is superior in frequency and temperature characteristics of electrostatic capacity, loss, impedance, etc. and may also be considerably miniaturized in dimension. This is especially true of tantalum, since it can enlarge the effective surface area by sintering fine powder of high purity in vacuum. Tantalum is thus a preferred material.

Aluminum and titanium, however, are not preferred, because it is difficult to obtain fine powder of high purity from them and the sintering technique is difficult. These materials are ordinarily made anode elements by etching plates and wires. Consequently, although a condenser of small capacitance may be made, a condenser of large capacitance cannot be made, and the dimensions of the condenser are large.

For these reasons, it has been tried to make solid electrolytic condensers by winding etched foils. However, prior art wound foil type solid electrolytic condensers are unsatisfactory in characteristics and furthermore, the breakdown voltage is low compared with charging voltage, so that they cannot be miniaturized. This is due to the fact that since the foils are thin, films, coatings or layers formed thereon are easily damaged during winding and the like, and due to the fact that thermal deformation is caused in the coating of manganese dioxide by pyrolysis of manganese nitrate. For these reasons, it is necessary to pay special attention to the forming method and to the winding method.

A wound foil type solid electrolytic condenser may be made by winding only an anode foil having an oxidized film thereon, and then coating it with a semiconductor layer such as, for example, manganese dioxide. A graphite layer may then be provided and a metallic contact may be provided as the cathode. However, if only the anode element is made by winding the foil, coating manganese dioxide thereon and then dipping in colloidal graphite for a short time, the manganese dioxide does not readily fully permeate the inner crevices and the like of the anode foil, so that the equivalent series resistance of the semiconductor layer is large and the frequency characteristic of the condenser is very poor. Furthermore, when colloidal graphite is utilized to fully permeate the crevices and the like of the anode foil, the condenser leakage current increases to a very considerable extent.

In order to eliminate the graphite layer and the metallic contact, which adversely influence the breakdown voltage of the solid electrolytic condenser, and yet obtain a wound foil type solid electrolytic condenser of favorable characteristics, it is necessary to decrease the series resistance of the semiconductor layer by winding the anode foil and the cathode foil as a unit.

However, when the anode foil and the cathode foil are juxtaposed and are wound, they usually short-circuit and do not provide an operable condenser. Accordingly, it is necessary to separate the anode foil and the cathode foil from each other to keep them out of direct electrical contact with each other. Furthermore, the separating material must have great thermal stability to withstand temperatures beween 300 and 400° C. at which the manganese dioxide and manganese nitrate are coated by pyrolysis.

Glass fiber is highly suitable for use as the separating material. A wound foil type solid electrolytic condenser utilizing glass fiber as the separating material has more desirable characteristics than the aforementioned types of condensers. However, since the area of the holes of the texture of glass fiber is small compared with the area of the entire glass fiber, and since the distance between the anode and cathode becomes large, the series resistance is increased by the glass fiber. Furthermore, the frequency characteristic is undesirably poor. Also, glass fiber is entirely unnecessary for the condenser functionally, and its utilization not only enlarges the dimensions of the condenser but increases the cost thereof.

The principal object of the present invention is to provide a new and improved method of manufacture of a wound foil type solid electrolytic condenser.

An object of the present invention is to provide a method of manufacture of a wound foil type solid electrolytic condenser which avoids the disadvantages of the prior art types.

In accordance with the present invention, in a method of manufacture of a wound foil type solid electrolytic condenser, the anode foil and cathode foil are placed in juxtaposition and are wound together as a unit.

In the method of the present invention, an oxidized film is applied to an anode foil and a semiconductor layer of manganese dioxide is applied to the oxidized film on the anode foil. A semiconductor layer is applied to a cathode foil. The anode foil is adhered to the cathode foil in juxtaposition and both the anode foil and the cathode foil are wound together as a unit. The common area between the semiconductor layers of the anode foil and the cathode foil and the unit are coated with semiconductor material.

In order that the present invention may be readily carried into effect, it will now be described with reference to the accompanying drawings, wherein:

FIG. 1 is a sectional view of an embodiment of a wound foil type solid electrolytic condenser manufactured by the method of the present invention;

FIG. 2 is a sectional view of an embodiment of a solid electrolytic condenser may by a method comprising winding only an anode foil;

FIG. 3 is a sectional view of an embodiment of a solid electrolytic condenser made by a method utilizing glass fiber as insulating and separating material between the anode and cathode foils;

Figure 4:
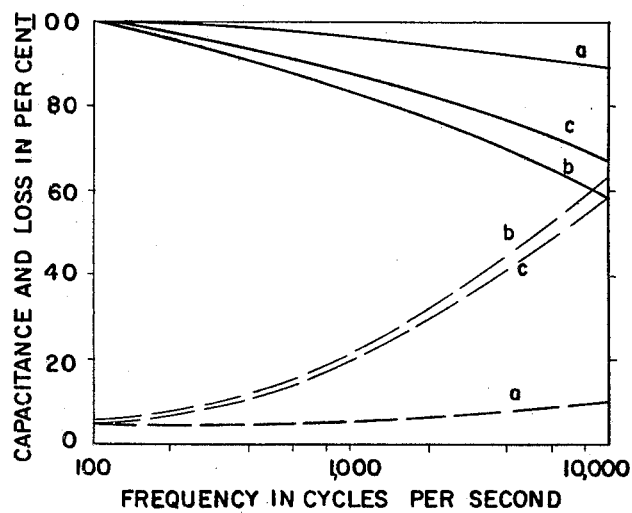
FIG. 4 is a graphical presentation of the frequency versus electrostatic capacitance and loss characteristics of the embodiments of the condensers of FIGS. 1, 2 and 3.

In FIG. 1, anode foil 1 is covered with oxidized film 2. A semiconductor layer 3 such as, for example, manganese dioxide, is provided on the oxidized film 2. A cathode foil 4, wound together with the anode foil 1 as a unit, is provided with a semiconductor layer 5 which is preferably thin. The anode foil 1 is adhered to the cathode foil 4 in juxtaposition; either semiconductor layer 3 or 5 may be made sufficiently adhesive to cause such adherence.

After the anode foil 1 and the cathode foil 4 are wound together as a unit, a semiconductor layer 6 is coated on the common area between the semiconductor layers 3 and 5 of the anode foil and the cathode foil and on the other surfaces of the wound unit. The semiconductor layer 6 may comprise manganese dioxide. The wound unit may be immersed in manganese nitrate solution to insure permeation of the inner crevices and the like of said wound unit.

The coated wound unit is then heated to a temperature of between 250 and 350° C. to precipitate manganese dioxide. This process is then repeated once or twice. Electrode leads 7 and 8 of aluminum, for example, may be initially affixed to the anode foil 1 and to the cathode foil 4, respectively, by any suitable means, such as, for example, soldering, welding, brazing or the like.

The oxidized film provided on the anode foil 1 extends as an oxidized film 9 on the electrode lead 7. The oxidized film 2 and its extending oxidized film 9 prevent short-circuit of the anode and cathode foils. The electrode leads 7 and 8 may comprise suitable material other than aluminum such as, for example, copper or copper and tin. If copper and tin electrode leads are utilized, it is necessary to coat them initially with silicon resin or the like to prevent corrosion by contact with liquid utilized in the method and to prevent short-circuit of the anode and cathode foils. The portions coated with the resin are these which come in contact with the liquid and with the manganese dioxide. Any suitable combination of aluminum and copper and tin leads may be utilized; part of the lead length being aluminum and part of the lead length being copper and tin which are readily soldered to the foils.

It is thus seen that the method of the present invention does not utilize a glass fiber separation and insulating material between the anode and cathode foils. The semiconductor layers function to separate the anode and cathode foils and the oxidized film around the anode foil functions to insulate such foils.

FIG. 2 is an embodiment of a solid electrolytic condenser in which only an anode foil 11 is wound. An oxidized film 12 is provided on the anode foil 11. A semiconductor layer 13 is provided on the wound anode foil on all its surfaces. A graphite layer 14 is provided on the semiconductor layer 13 around the wound unit. A metal coating 15 is provided on the graphite layer 14. An electrode lead 16 is affixed to the anode foil 11. An extending portion 17 of the oxidized film 12 is provided on the electrode lead 16. An electrode lead 18 is affixed to the metal coating 15 by, for example, solder 19.

FIG. 3 is an embodiment of a solid electrolytic condenser in which glass fiber 21 is utilized to separate and insulate the anode foil 22 and the cathode foil 23 from each other. An oxidized film 24 is provided on the anode foil 22. A semiconductor layer 25 is provided with the glass fiber 21 between the anode and cathode foils 22 and 23 and on the wound unit comprising said foils and said glass fiber. An electrode lead 26 is suitably affixed to the anode foil 22 and an electrode lead 27 is suitably affixed to the cathode foil 23. An extending portion 28 of the oxidized film 24 is provided on the electrode lead 26.

Figure 5:
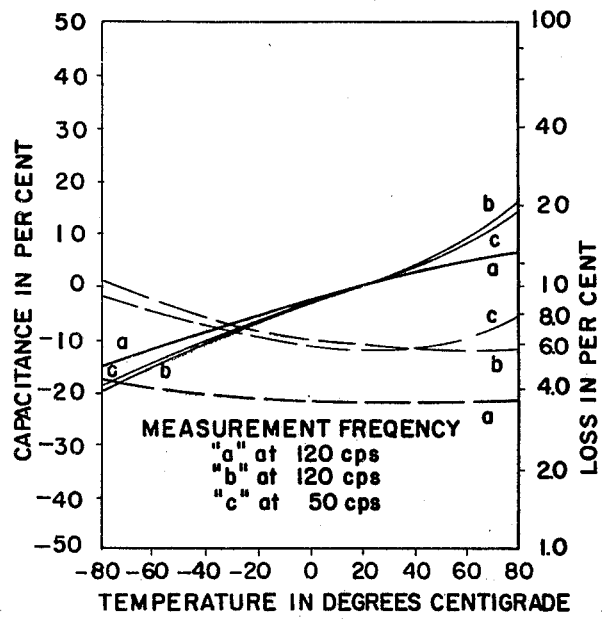
FIG. 5 is a graphical presentation of the temperature versus electrostatic capacitance and loss characteristics of the embodiments of FIGS. 1, 2 and 3.

FIGS. 4 and 5 illustrate the frequency, temperature and electrostatic capacitance and loss characteristics of the solid electrolytic condensers of FIGS. 1, 2 and 3. Each of the embodiments of FIGS. 1, 2 and 3 tested to provide the curves of FIGS. 4 and 5 were provided with anode and cathode foils comprising aluminum 99.99% pure, suitably etched. The semiconductor layers in each of these embodiments comprise manganese dioxide precipitated by pyrolysis of manganese nitrate solution. The tested condensers of the embodiments of FIGS. 1 and 2 were manufactured to have an electrostatic capacitance of 5 microfarads at a rated voltage of 25 volts and the condenser of the embodiment of FIG. 3 was manufactured to have an electrostatic capacitance of 16 microfarads at a rated voltage of 10 volts.

In FIG. 4, the abscissa represents frequency in cycles per second and the ordinate represents electrostatic capacitance and loss in percent. In FIG. 5, the abscissa represents temperature in degrees C. and the ordinate represents electrostatic capacitance and loss in percent. In each of FIGS. 4 and 5, $a$ indicates the condenser of FIG. 1, $b$ indicates the condenser of FIG. 2 and $c$ indicates the condenser of FIG. 3. In each of FIGS. 4 and 5 the full-line curves represent electrostatic capacitance and the broken-line curves represent loss.

The curves of FIGS. 4 and 5 clearly illustrate the superior and desirable characteristics of a wound foil type solid electrolytic condenser manufactured by the method of the present invention over a solid electrolytic condenser in which only an anode foil is wound and over a solid electrolytic condenser in which glass fiber is utilized to separate and insulate the anode foil and the cathode foil from each other.

If the semiconductor layer 6 of the condenser of FIG. 1 is thin and has good adhesive qualities, it may be coated on the cathode foil 4 by pyrolysis or heating, electrolysis or other suitable method. Furthermore, a semiconductor layer need not necessarily be provided on both the anode and cathode foils prior to winding, but may be provided on only one of the anode and cathode foils. Any suitable semiconductor material may be utilized as the semiconductor layer. Thus, for example, aside from manganese dioxide, which may be used, lead dioxide, lead sulfide or other materials may be utilized as the semiconductor layer.

Furthermore, a fine powder of manganese dioxide may be suspended in appropriate lacquer and painted on the surfaces of the cathode foil 4. After drying, winding and pyrolysis of the manganese nitrate, the lacquer resolves and is carbonized, and the electrical conductivity of this semiconductor layer is improved so that the wound foil type solid electrolytic condenser manufactured by the method of the present invention has such additional advantage.

A wound foil type solid electrolytic condenser of nonpolarity may also be manufactured by winding a cathode foil instead of an anode foil as indicated in FIG. 2. Furthermore, the material or metal of the cathode foil may be different from that of the anode foil. It may be less expensive, for example, to utilize aluminum as the cathode foil although tantalum or titanium is utilized as the anode foil, the aluminum being less expensive than the tantalum or titanium. The cathode foil may comprise aluminum, tantalum or titanium.

We claim:
1. A method of manufacture of a wound foil type solid electrolytic condenser, comprising the steps of:
    applying a semiconductor layer composed of a material selected from the group of manganese dioxide, lead dioxide and lead sulfide to a cathode foil composed of a material selected from the group of aluminum, tantalum and titanium;
    placing an anode foil composed of a material selected from the group of aluminum, tantalum and titanium and the semiconductor-covered cathode foil in juxtaposition; and
    winding both said anode foil and said semiconductor-covered cathode foil together as a unit.

2. A method of manufacture of a wound foil type solid electrolytic condenser, comprising the steps of:

applying an oxidized film to an anode foil composed of a material selected from the group of aluminum, tantalum and titanium;

applying a semiconductor layer composed of a material selected from the group of manganese dioxide, lead dioxide and lead sulfide to the oxidized film on the anode foil;

applying said semiconductor layer to a cathode foil composed of a material selected from the group of aluminum, tantalum and titanium;

placing the oxide and semiconductor-covered anode foil and the semiconductor-covered cathode foil in juxtaposition; and winding both the semiconductor-covered anode foil and the semiconductor-covered cathode foil together as a unit.

3. A method of manufacture of a wound foil type solid electrolytic condenser, comprising the steps of:

applying an oxidized film to an anode foil composed of a material selected from the group of aluminum, tantalum and titanium;

applying a semiconductor layer composed of a material selected from the group of manganese dioxide, lead dioxide and lead sulfide to the oxidized film on the anode foil;

applying said semiconductor layer to a cathode foil composed of a material selected from the group of aluminum, tantalum and titanium;

placing the oxide and semiconductor-covered anode foil and the semiconductor-covered cathode foil in juxtaposition;

winding both said semiconductor-covered anode foil and said semiconductor-covered cathode foil together as a unit;

applying to the common area betwen the semi-conductor layers of said anode foil and said cathode foil and the unit liquid semiconductor material; and heating the common area and unit to solidify the semiconductor material.

4. A method of manufacture of a wound foil type solid electrolytic condenser, comprising the steps of:

applying a semiconductor layer composed of a material selected from the group of manganese dioxide, lead dioxide and lead sulfide to an anode foil composed of a material selected from the group of aluminum, tantalum and titanium;

applying said semiconductor layer to a cathode foil composed of a material selected from the group of aluminum, tantalum and titanium;

placing the semiconductor-covered anode foil and the semiconductor-covered cathode foil in juxtaposition; and winding both said semiconductor-covered anode foil and said semiconductor-covered cathode foil together as a unit.

5. A method of manufacture of a wound foil type solid electrolytic condenser, comprising the steps of:

applying an oxidized film to an anode foil composed of a material selected from the group of aluminum, tantalum and titanium;

applying a semiconductor layer composed of a material selected from the group of manganese dioxide, lead dioxide and lead sulfide to the oxidized film on the anode foil;

applying said semiconductor layer to a cathode foil composed of a material selected from the group of aluminum, tantalum and titanium;

placing oxide and semiconductor-covered anode foil to the semiconductor-covered cathode foil in juxtaposition;

winding both said semiconductor-covered anode foil and said semiconductor-covered cathode foil together as a unit; and applying to the common area between the semiconductor layers of said anode foil and said cathode foil and the unit liquid manganese nitrate; and heating the common area and unit to solidify the liquid to manganese dioxide.

References Cited
UNITED STATES PATENTS

| | | |
|---|---|---|
| 3,028,447 | 4/1962 | Flaschen et al. |
| 3,311,797 | 3/1967 | Siddall _____ 317—230 |
| 3,196,323 | 7/1965 | Rogers et al. _____ 317—230 |
| 3,066,247 | 11/1962 | Robinson. |

PHILIP DIER, Primary Examiner

U.S. Cl. X.R.

29—25.41, 570; 117—200; 156—278; 317—230